(12) United States Patent
Kim

(10) Patent No.: US 10,974,849 B2
(45) Date of Patent: Apr. 13, 2021

(54) DRONE LANDING APPARATUS

(71) Applicant: Hyundai Mobis Co., Ltd., Seoul (KR)

(72) Inventor: Seon Yeob Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 322 days.

(21) Appl. No.: 16/207,925

(22) Filed: Dec. 3, 2018

(65) Prior Publication Data

US 2019/0177005 A1    Jun. 13, 2019

(30) Foreign Application Priority Data

Dec. 7, 2017  (KR) .......................... 10-2017-0167351

(51) Int. Cl.
 *B64F 1/22*  (2006.01)
 *B64F 1/00*  (2006.01)
 *B64C 39/02*  (2006.01)

(52) U.S. Cl.
 CPC ............ *B64F 1/222* (2013.01); *B64C 39/024* (2013.01); *B64F 1/007* (2013.01); *B64C 2201/088* (2013.01); *B64C 2201/141* (2013.01); *B64C 2201/208* (2013.01)

(58) Field of Classification Search
 CPC ........ B64F 1/222; B64F 1/007; B64C 39/024; B64C 2201/008; B64C 2201/141; B64C 2201/208
 See application file for complete search history.

(56) References Cited

U.S. PATENT DOCUMENTS

| | | | |
|---|---|---|---|
| 2010/0144234 A1* | 6/2010 | Wai | A63H 30/04 446/75 |
| 2016/0272317 A1* | 9/2016 | Cho | G05D 1/0088 |
| 2017/0132562 A1* | 5/2017 | High | G06Q 10/0833 |
| 2018/0170191 A1* | 6/2018 | Xing | B64F 1/005 |
| 2020/0031471 A1* | 1/2020 | Datta Gupta | B60K 15/00 |
| 2020/0174477 A1* | 6/2020 | Li | B64C 39/024 |

* cited by examiner

*Primary Examiner* — Rodney A Bonnette
(74) *Attorney, Agent, or Firm* — H.C. Park & Associates, PLC

(57) ABSTRACT

A drone landing apparatus may include: a trunk door configured to open or close a trunk of a vehicle; a drone housing contained in the trunk, and configured to provide a space in which a drone is housed; a rotator mounted on the trunk door, and configured to rotate the drone housing according to an opening angle of the trunk door; and a moving platform appearing from the drone housing or disappearing into the drone housing, and having the drone seated thereon.

7 Claims, 12 Drawing Sheets

DRONE LANDING APPARATUS

CROSS-REFERENCES TO RELATED APPLICATION

This application claims priority from and the benefit of Korean Patent Application No. 10-2017-0167351, filed on Dec. 7, 2017, which is hereby incorporated by reference for all purposes as if set forth herein.

BACKGROUND

Field

Exemplary embodiments relate to a drone landing apparatus, and more particularly, to a drone landing apparatus which can keep a drone in a vehicle.

Discussion of the Background

A drone refers to a radio-controlled unmanned flying object, and includes various pieces of equipment such as an optical sensor, infrared sensor and radar sensor, in order to monitor and patrol an area to which a person cannot access in person, while relaying communication information.

The drone requires a landing apparatus for storage or charge. Recently, a drone landing apparatus is installed in a vehicle, for convenience of movement and storage. In the conventional drone landing apparatus installed in the vehicle, a storage box for a drone may be installed outside or inside the vehicle.

When the storage box for the drone is installed outside the vehicle, the storage box protrudes to the outside of the vehicle in operation. In this case, the design of the vehicle may be degraded, and a safety problem may occur. On the other hand, when the storage box for the drone is installed inside the vehicle, the drone needs to be manually taken out. In this case, a user's convenience may be reduced. Therefore, there is a demand for a device capable of solving such problems.

The related art of the present invention is disclosed in Korean Patent Publication No. 10-2017-0027616 published on Mar. 10, 2017 and entitled "Drone control system based on vehicle landing field and control method thereof."

The above information disclosed in this Background section is only for enhancement of understanding of the background of the invention and, therefore, it may contain information that does not constitute prior art.

SUMMARY

Exemplary embodiments of the present invention are directed to a drone landing apparatus which can keep a drone in a vehicle.

In one embodiment, a drone landing apparatus may include: a trunk door configured to open/close a trunk of a vehicle; a drone housing contained in the trunk, and configured to provide a space in which a drone is housed; a rotator mounted on the trunk door, and configured to rotate the drone housing according to an opening angle of the trunk door; and a moving platform appearing from the drone housing or disappearing into the drone housing, and having the drone seated thereon.

The moving platform may include: a drone support slidably mounted in the drone housing, and having the drone placed thereon; a door installed at an end of the drone support so as to close the drone housing; and a driving mechanism mounted in the drone housing, and configured to slide the drone support.

The moving platform may further include a charger mounted in the drone support and configured to charge the drone.

The charger may charge the drone through a magnetic induction method or resonant induction method.

The rotator may include: a motor fixed to the trunk door; a power transmitter rotatably mounted on the motor; and a housing support fixed to the drone housing, and configured to rotate the drone housing according to the rotation of the power transmitter.

The rotator may rotate the drone housing such that the drone housing is horizontal to the ground surface.

The drone housing may have a horizontal sensor mounted thereon and configured to sense whether the drone housing is horizontal to the ground surface, and the drone landing apparatus may further include a controller configured to control the operations of the rotator and the moving platform based on information measured by the horizontal sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
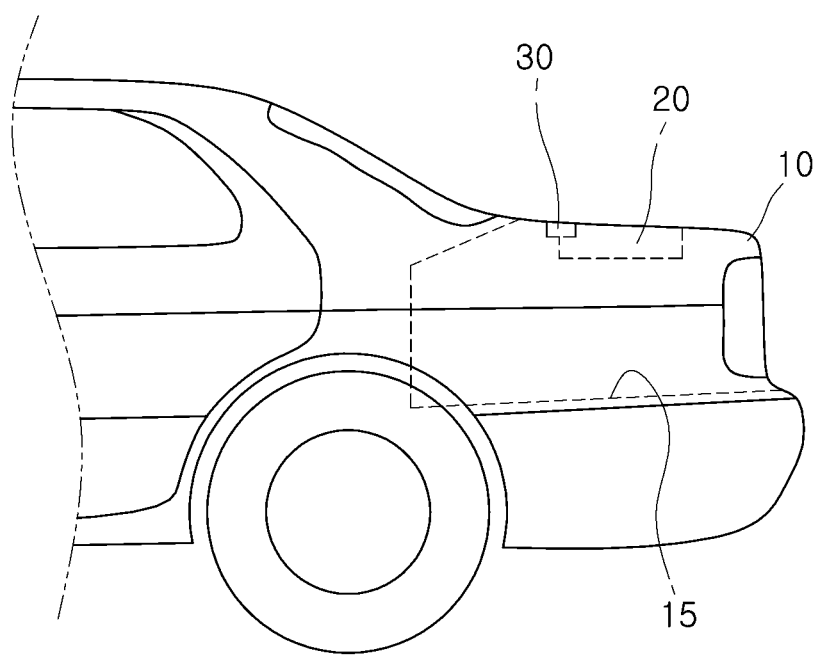
FIG. 1 schematically illustrates a drone landing apparatus in a closed trunk of a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
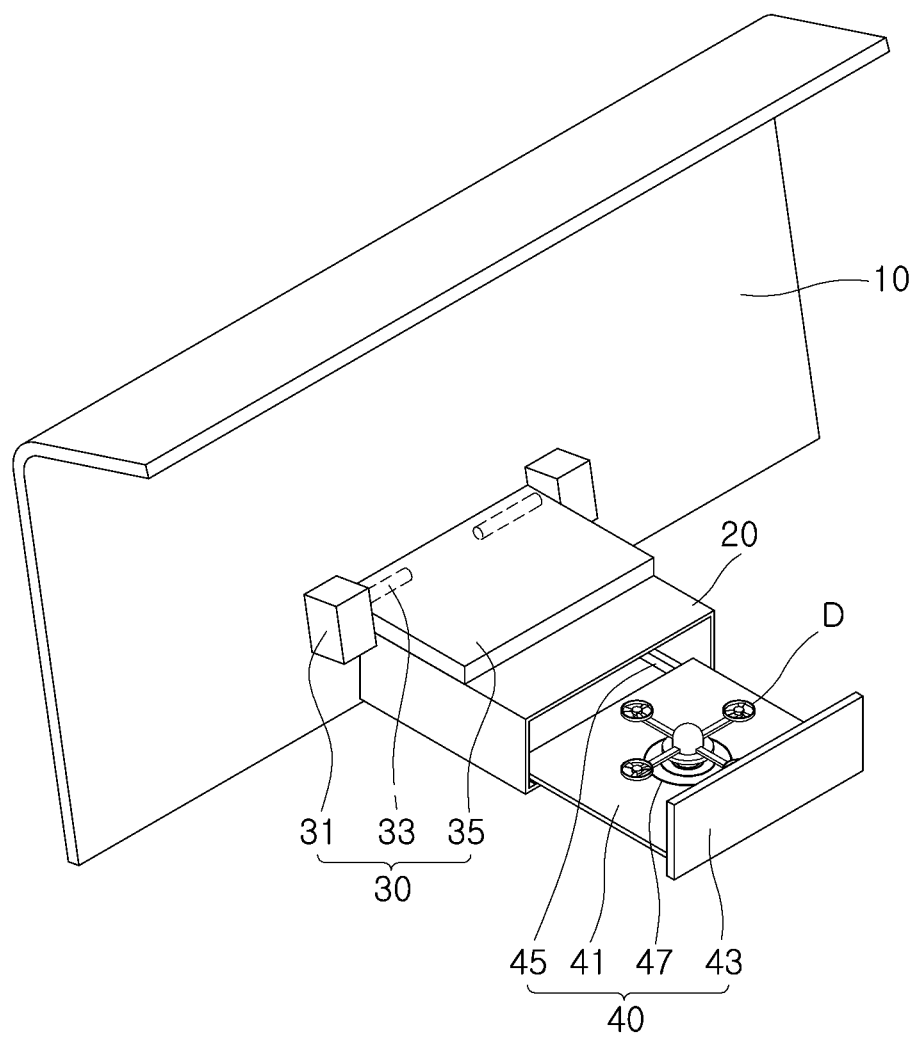
FIG. 2 is a perspective view schematically illustrating the drone landing apparatus in the opened trunk of the vehicle in accordance with the embodiment of the present invention.
Figure 3:
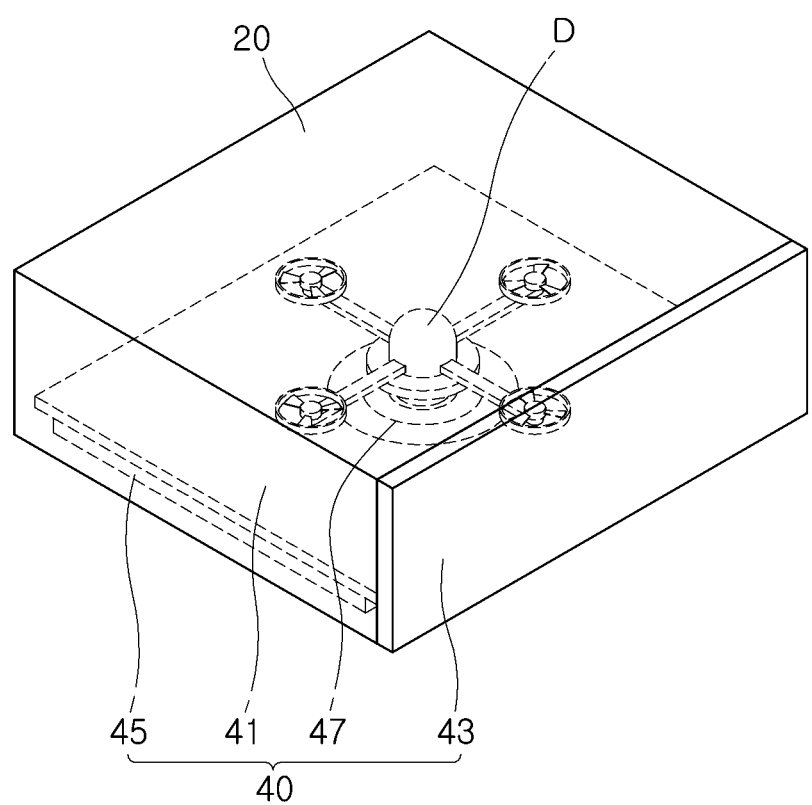
FIG. 3 is a perspective view schematically illustrating a drone housing in accordance with the embodiment of the present invention.
Figure 4:
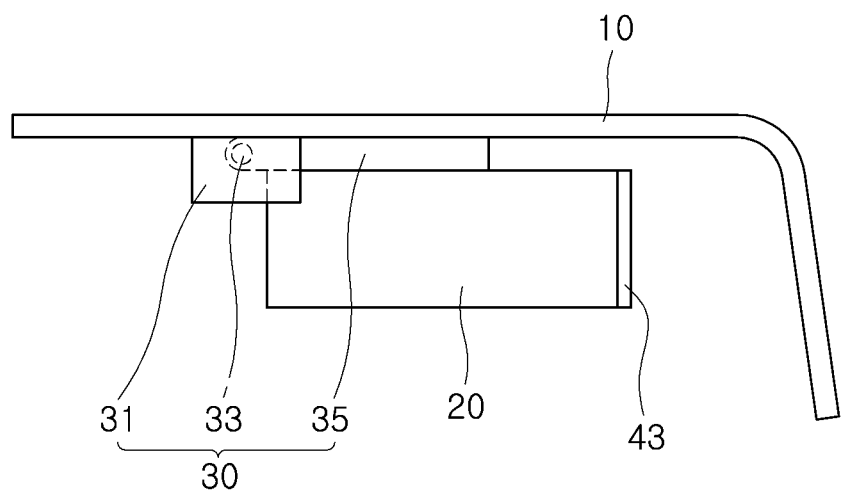
FIG. 4 is a conceptual view schematically illustrating a state before the drone landing apparatus in accordance with the embodiment of the present invention is operated.
Figure 5:
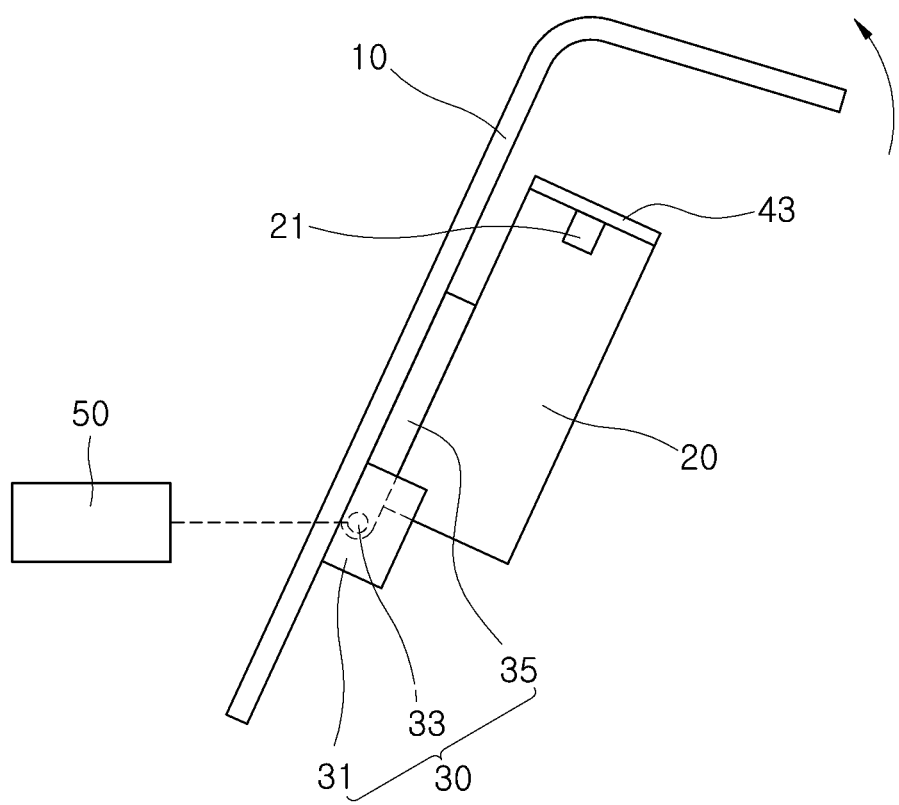
FIG. 5 is a conceptual view schematically illustrating that a trunk door is opened in the drone landing apparatus in accordance with the embodiment of the present invention.
Figure 6:
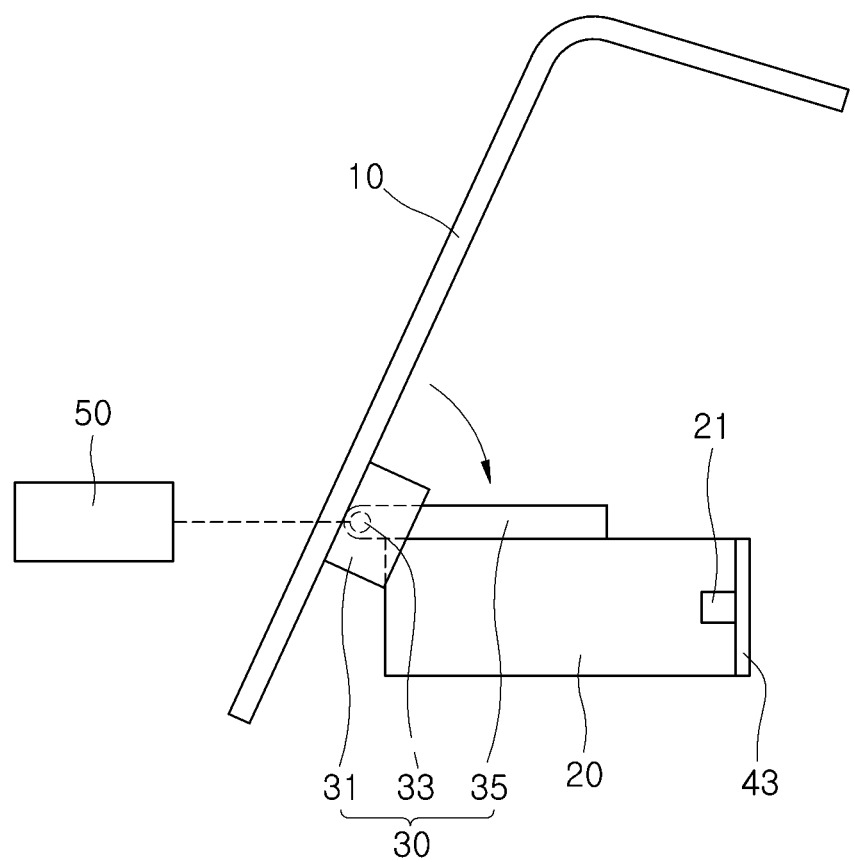
FIG. 6 is a conceptual view schematically illustrating that the drone housing is rotated in one direction in the drone landing apparatus in accordance with the embodiment of the present invention.
Figure 7:
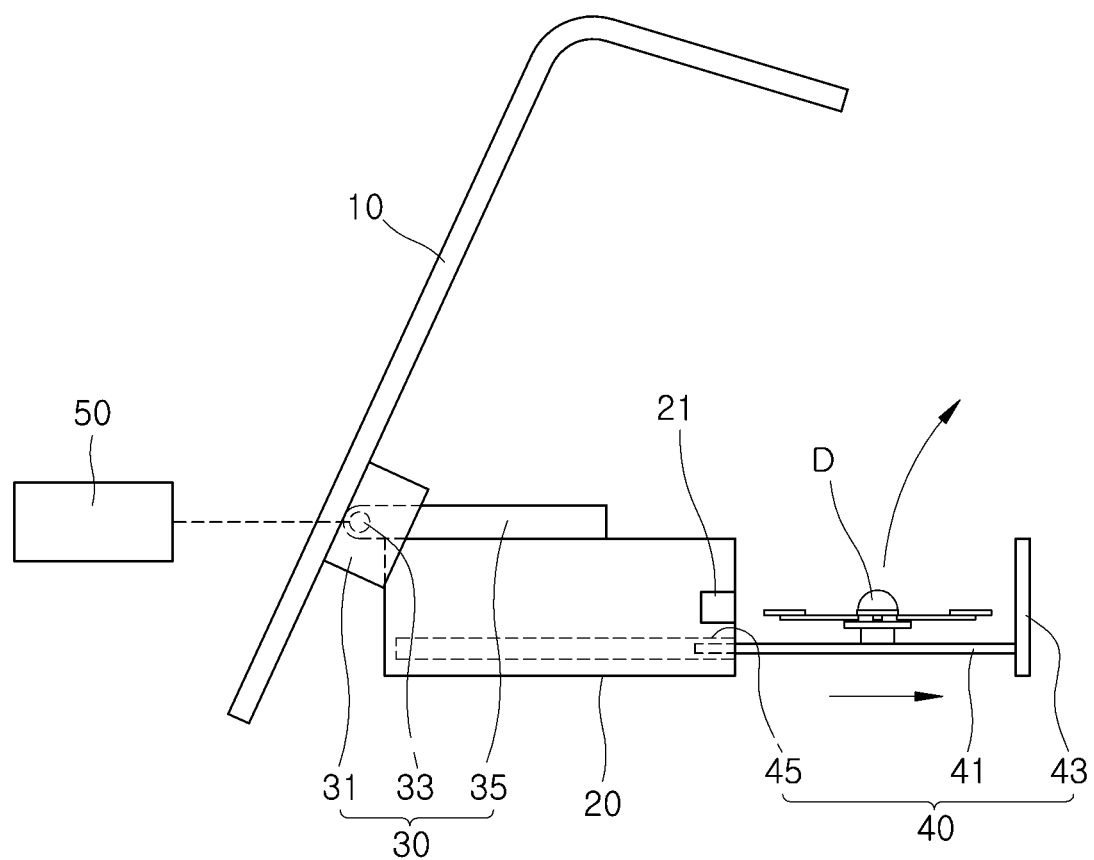
FIG. 7 is a conceptual view schematically illustrating that a moving platform opens the drone housing in the drone landing apparatus in accordance with the embodiment of the present invention.
Figure 8:
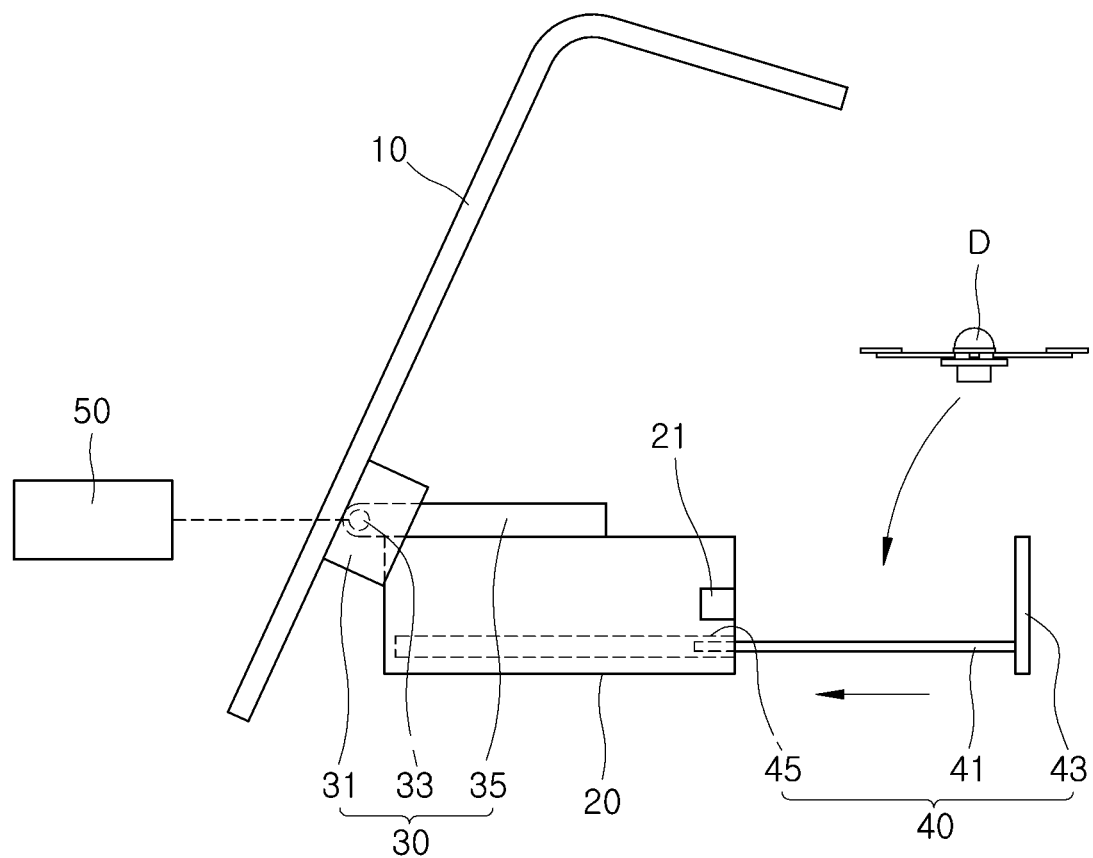
FIG. 8 is a conceptual view schematically illustrating that the moving platform closes the drone housing in the drone landing apparatus in accordance with the embodiment of the present invention.
Figure 9:
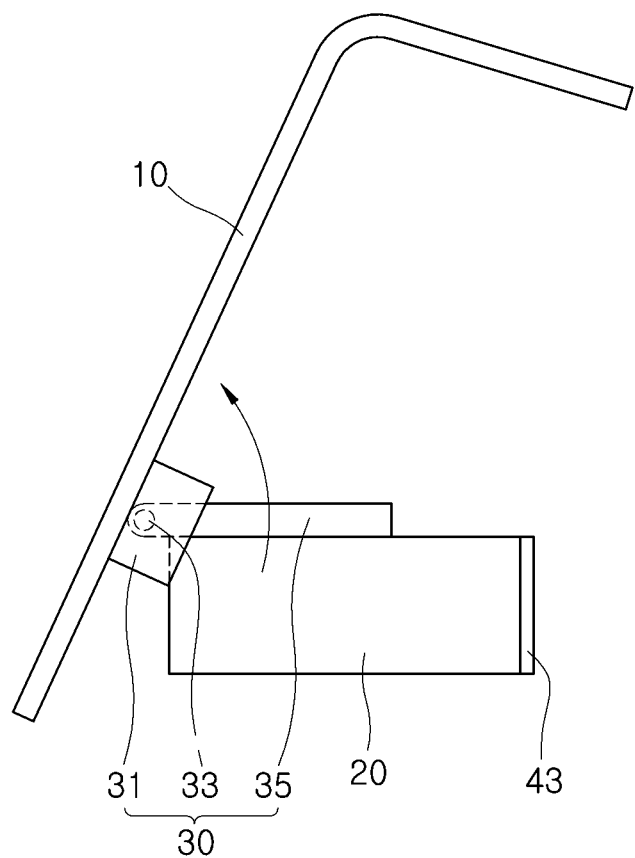
FIG. 9 is a conceptual view schematically illustrating that the drone housing is rotated in the other direction in the drone landing apparatus in accordance with the embodiment of the present invention.
Figure 10:
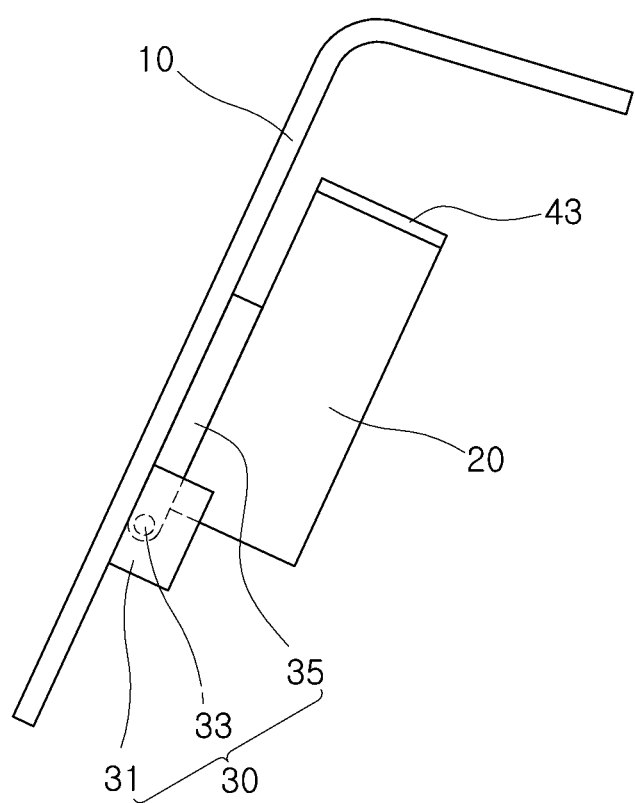
FIG. 10 is a conceptual view schematically illustrating that the drone housing is positioned close to the trunk door in the drone landing apparatus in accordance with the embodiment of the present invention.
Figure 11:
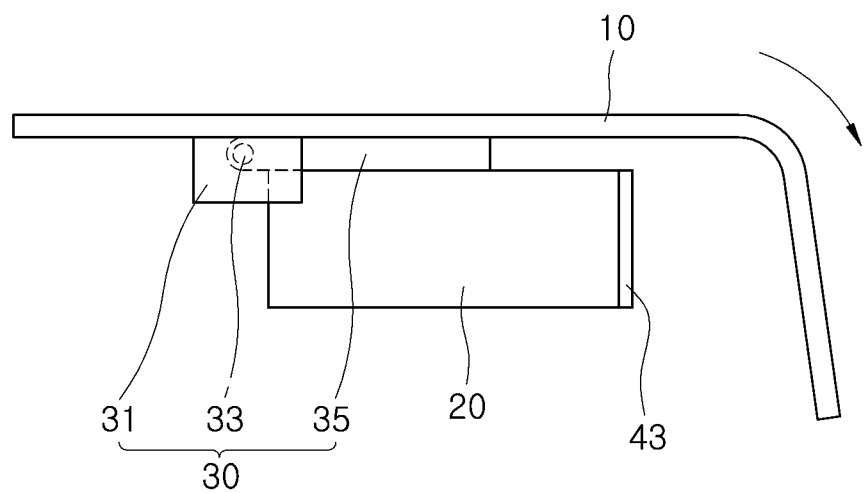
FIG. 11 is a conceptual view schematically illustrating that the trunk door is closed in the drone landing apparatus in accordance with the embodiment of the present invention.
Figure 12:
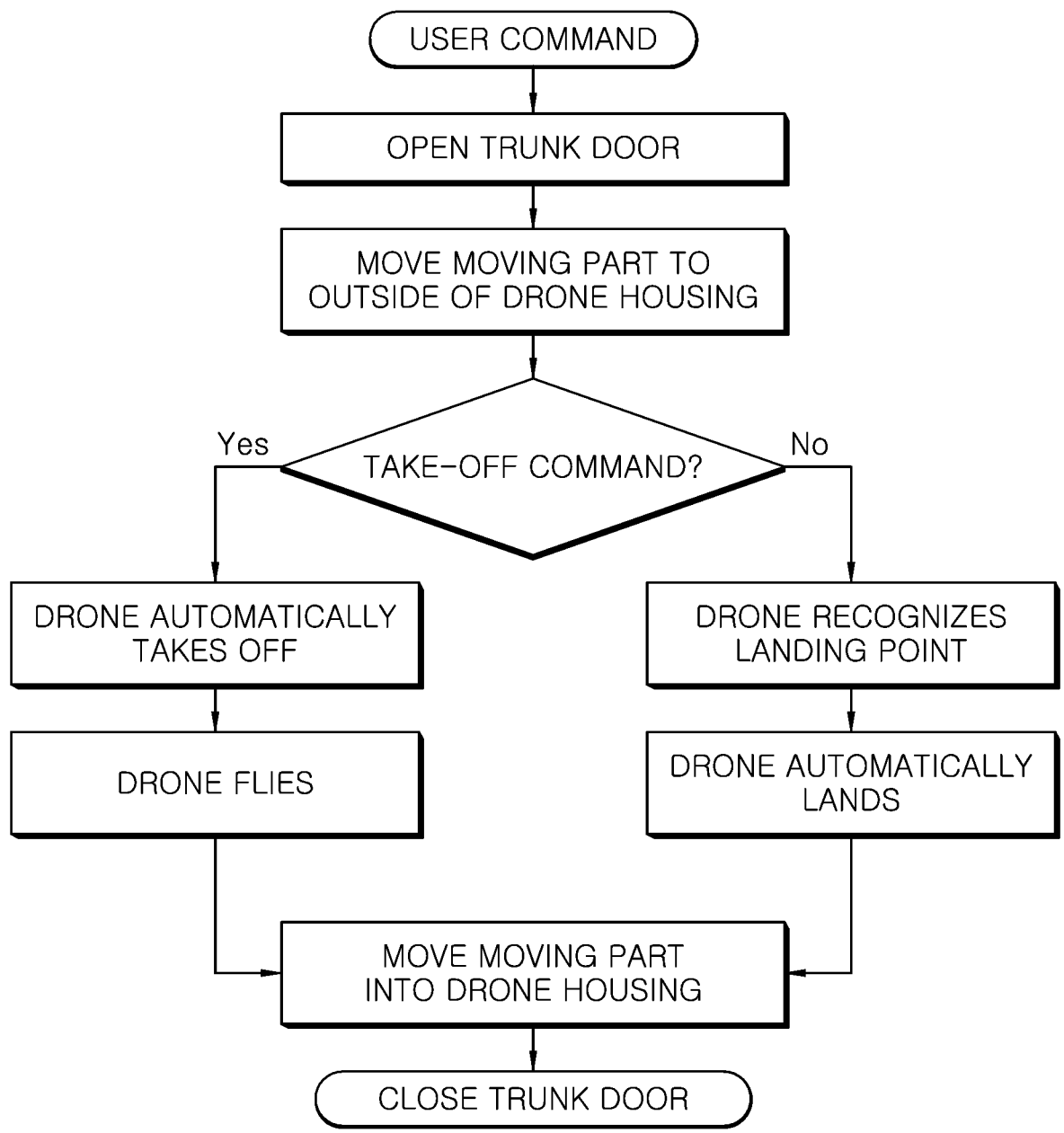
FIG. 12 is a flowchart schematically illustrating the operation of the drone landing apparatus in accordance with an embodiment of the present invention.

FIG. 1 schematically illustrates a drone landing apparatus in a closed trunk of a vehicle in accordance with an embodiment of the present invention, FIG. 2 is a perspective view schematically illustrating the drone landing apparatus in the opened trunk of the vehicle in accordance with the embodiment of the present invention, FIG. 3 is a perspective view schematically illustrating a drone housing in accordance with the embodiment of the present invention, FIG. 4 is a conceptual view schematically illustrating a state before the drone landing apparatus in accordance with the embodiment of the present invention is operated, FIG. 5 is a conceptual view schematically illustrating that a trunk door is opened in the drone landing apparatus in accordance with the embodiment of the present invention, FIG. 6 is a conceptual view schematically illustrating that the drone housing is rotated in one direction in the drone landing apparatus in accordance with the embodiment of the present invention, FIG. 7 is a conceptual view schematically illustrating that a moving platform opens the drone housing in the drone landing apparatus in accordance with the embodiment of the present invention, FIG. 8 is a conceptual view schematically illustrating that the moving platform closes the drone housing in the drone landing apparatus in accordance with the embodiment of the present invention, FIG. 9 is a conceptual view schematically illustrating that the drone housing is rotated in the other direction in the drone landing apparatus in accordance with the embodiment of the present invention, FIG. 10 is a conceptual view schematically illustrating that the drone housing is positioned close to the trunk door in the drone landing apparatus in accordance with the embodiment of the present invention, FIG. 11 is a conceptual view schematically illustrating that the trunk door is closed in the drone landing apparatus in accordance with the embodiment of the present invention, and FIG. 12 is a flowchart schematically illustrating the operation of the drone landing apparatus in accordance with an embodiment of the present invention.

Referring to FIGS. 1 to 3, the drone landing apparatus in accordance with the embodiment of the present invention may include a trunk door 10, a drone housing 20, a rotator 30 and a moving platform 40. The trunk door 10 may be rotatably coupled to a trunk 15 of a vehicle, and serve to open/close the trunk 15.

The drone housing 20 may be housed in the trunk 15, and rotatably connected to the trunk door 10 through the rotator 30. The drone housing 20 may have an internal space for housing the drone D. In an embodiment of the present invention, the drone housing 20 may be formed in a hexahedron shape which is larger than the drone D, has an empty space therein, and has one opened surface (right surface based on FIG. 2).

The drone housing 20 may include a horizontal sensor 21 for sensing a horizontal state, and the horizontal sensor 21 may sense how much the drone housing 20 is tilted, and check whether the drone housing 20 is horizontal to the ground surface, while rotated by the rotator 30.

The rotator 30 may be mounted on the trunk door 10, and rotate the drone housing 20 according to the opening degree of the trunk door 10. The drone housing 20 rotated by the rotator 30 may be rotated so as to be horizontal to the ground surface. In the present embodiment, a pair of rotators 30 may be disposed at both sides of the drone housing 20.

The rotator 30 may include a motor 31, a power transmitter 33 and a housing support 35. The motor 31 may be fixed to the trunk door 10, and rotate the power transmitter 33. The power transmitter 33 may be formed in a rod shape which is rotatably mounted in the motor 31 and fixed to the housing support 35. The housing support 35 may be fixed to one surface (bottom surface based on FIG. 2) of the drone housing 20, and connected to the power transmitter 33. While the housing support 35 is rotated according to the rotation of the power transmitter 33, the housing support 35 may adjust the angle of the drone housing 20 such that the drone housing 20 becomes horizontal to the ground surface.

When the horizontal sensor 21 senses that the drone housing 20 is horizontal to the ground surface, the horizontal sensor 21 may transmit information on the horizontal state to a controller 50. The controller 50 may suspend the operation of the rotator 30, and operate the moving platform 40 to protrude from the drone housing 20.

The moving platform 40 may appear or disappear while moved in the longitudinal direction (side-to-side direction in FIG. 7) of the drone housing 20. The moving platform 40 may be protruded from the drone housing 20, such that the drone D housed in the drone housing 20 can take off or the drone D having finished a flight can land. The moving platform 40 may include a drone support 41, a door 43, a driving mechanism 45 and a charger 47.

The drone support 41 may be slid in the drone housing 20, and the drone D may be seated on the drone support 41. The drone support 41 may have a size corresponding to the bottom surface of the drone housing 20.

The door 43 may be installed at an end of the drone support 41 (right end based on FIG. 2) so as to be perpendicular to the drone support 41, and close the drone housing 20 when abutted on the opened surface of the drone housing 20 (right surface based on FIG. 2) or open the drone housing 20 when separated from the opened surface of the drone housing 20.

The driving mechanism 45 may be mounted in the drone housing 20, and slide the drone support 41. The driving mechanism 45 may be configured as a linear motor, and slide the drone support 41 through the opened surface of the drone housing 20, such that the drone support 41 can appear from the drone housing 20 or disappear into the drone housing 20.

The charger 47 may be mounted on the drone support 41 so as to charge the drone D. The charger 47 may be formed in the center of the drone support 41, and have a drone landing induction marker drawn in red color or the like thereon, in order to induce the landing of the drone D.

The charger 47 may be configured as a magnetic induction wireless charger. The magnetic induction wireless charger may charge the drone D using the electromagnetic induction principle that a power transmitter coil generates a magnetic field and electricity is induced in a receiver coil by the influence of the magnetic field.

Alternatively, the charger 47 may be configured as a resonant induction wireless charger. The resonant induction wireless charger may charge the drone D using the principle that a transmitter coil generates a magnetic field oscillating at a resonant frequency and energy is intensively transferred only to a receiver coil designed at the same resonant frequency. In the present invention, the structure of the charger 47 to charge the drone D through the magnetic induction method or the resonance induction method may be based on a general charging structure.

The charger 47 may include a separation prevention part (not illustrated) which is protruded from the drone support 41 so as to surround the charger 47 and prevent a separation of the drone D positioned in the charger 47. The separation prevention part may support the side surfaces of the drone D while the width thereof is adjusted, thereby preventing a separation of the drone D.

Referring to FIGS. 4 and 12, the operation of the drone landing apparatus in accordance with the embodiment of the present invention will be described. Referring to FIG. 4, the drone D may be housed in the drone housing 20 connected to the trunk door 10 of the vehicle trunk 15 through the rotator 30. Since the drone D is housed in the drone housing 20, the drone D can be moved according to the movement of the vehicle.

Referring to FIG. 5, the trunk door 10 may be rotated in the counterclockwise direction to open the trunk 15, when the drone D needs to be used. Referring to FIG. 6, the drone housing 20 connected to the housing support 35 of the rotator 30 may be rotated in the clockwise direction, while the power transmitter 33 of the rotator 30 is rotated in the clockwise direction. At this time, the rotator 30 may be operated in such a manner that the drone housing 20 becomes horizontal to the ground surface.

Referring to FIG. 7, the drone support 41 may be slid to the right from the drone housing 20 by the operation of the driving mechanism 45. The drone D may be seated on the drone support 41, and exposed to the outside from the drone housing 20 through the movement of the drone support 41. Then, the drone D may take off from the drone support 41 and fly toward its destination, according to a user's manipulation.

Referring to FIG. 8, the drone D having finished a work may land on the drone support 41 so as to be positioned on the charger 47. The drone D may be charged through the magnetic induction method or the resonant induction method by the charger 47. The drone support 41 having the drone D seated thereon may be moved to the left by the operation of the driving mechanism 45. Referring to FIG. 9, the door 43 may close the opened drone housing 20.

Referring to FIG. 10, the power transmitter 33 may be rotated to the left by the operation of the motor 31, the housing support 35 may be rotated by the rotation of the power transmitter 33, and the drone housing 20 connected to the housing support 35 may also be rotated to the left. The drone housing 20 may be positioned close to the trunk door 10.

Referring to FIG. 11, the trunk door 10 may close the trunk 15. Since the drone D is stably housed in the drone housing 20, the drone can be stably moved to a desired position by the vehicle.

FIG. 12 is a flowchart schematically illustrating the operation of the drone landing apparatus in accordance with the embodiment of the present invention. According to a user's command, the trunk door 10 may be opened, and the moving platform 40 may be protruded from the drone housing 20. Then, the controller 50 may determine whether the user's command is a take-off command.

When the user's command is a take-off command, the drone D seated on the moving platform 40 may automatically take off to fly. Then, the moving platform 40 may be moved into the drone housing 20, and the trunk door 10 may be closed.

On the other hand, when the user's command is not a take-off command but a landing command, for example, the drone D may recognize the landing point and automatically land on the moving platform 40. Then, the moving platform 40 on which the drone D has landed may be moved into the drone housing 20, and the trunk door 10 may be closed.

In the drone landing apparatus in accordance with the present embodiment, the trunk door 10, the drone housing 20, the rotator 30 and the moving platform 40 may be automatically driven through a series of processes by a user's manipulations on wired/wireless buttons.

In the drone landing apparatus in accordance with the present embodiment, the drone D may be housed in the drone housing 20 contained in the trunk 15 of the vehicle. Therefore, the drone D can be easily stored, and moved to a desired place.

Furthermore, the drone housing 20 in which the drone D is housed may not be exposed to the outside of the vehicle, but contained in the trunk 15 of the vehicle. Therefore, when the vehicle is driven, the drone housing 20 can be prevented from being exposed to the outside, which makes it possible to support the safe driving of the vehicle.

Furthermore, since the charger 47 is installed on the moving platform 40 mounted in the drone housing 20, the drone D can be easily charged.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A drone landing apparatus comprising:
   a trunk door configured to open or close a trunk of a vehicle;
   a drone housing contained in the trunk, and configured to provide a space in which a drone is housed;
   a rotator mounted on the trunk door, and configured to rotate the drone housing according to an opening angle of the trunk door; and
   a moving platform configured to carry the drone inside or outside the drone housing, and to have the drone seated thereon.

2. The drone landing apparatus of claim 1, wherein the moving platform comprises:
   a drone support slidably mounted in the drone housing, and configured to have the drone placed thereon;

a door installed at an end of the drone support to close the drone housing; and a driving mechanism mounted in the drone housing, and configured to slide the drone support.

3. The drone landing apparatus of claim 2, wherein the moving platform further comprises a charger mounted in the drone support and configured to charge the drone.

4. The drone landing apparatus of claim 3, wherein the charger is configured to charge the drone through a magnetic induction method or resonant induction method.

5. The drone landing apparatus of claim 1, wherein the rotator comprises:

a motor fixed to the trunk door;

a power transmitter rotatably mounted on the motor; and a housing support fixed to the drone housing, and configured to rotate the drone housing according to a rotation of the power transmitter.

6. The drone landing apparatus of claim 1, wherein the rotator is configured to rotate the drone housing such that the drone housing is horizontal to a ground surface.

7. The drone landing apparatus of claim 6, wherein the drone housing has a horizontal sensor mounted thereon and configured to sense whether the drone housing is horizontal to the ground surface, and the drone landing apparatus further comprises a controller configured to control operations of the rotator and the moving platform based on information measured by the horizontal sensor.

* * * * *